United States Patent [19]

Perry et al.

[11] 4,097,682

[45] Jun. 27, 1978

[54] MEANS FOR PROTECTING UNDERGROUND ELECTRICAL EQUIPMENT FROM THERMAL RUNAWAY

[75] Inventors: Elijah R. Perry, Portola Valley; Meredith J. Angwin; Mario Rabinowitz, both of Menlo Park, all of Calif.; John F. Shimshock, Somerset, N.J.

[73] Assignee: Electric Power Research Institute, Inc., Palo Alto, Calif.

[21] Appl. No.: 718,349

[22] Filed: Aug. 27, 1976

[51] Int. Cl.² .............................................. H01B 7/34
[52] U.S. Cl. ................................ 174/15 R; 174/15 C; 174/37
[58] Field of Search .................... 174/15 C, 15 R, 37, 174/23 R, 23 C, 98, 96; 61/72.1, 105, 106

[56] References Cited

U.S. PATENT DOCUMENTS

| 2,066,323 | 1/1937 | Bennett | 174/15 C |
|---|---|---|---|
| 3,082,111 | 3/1963 | Maddison et al. | 61/106 X |
| 3,582,533 | 6/1971 | Albright | 174/37 |
| 3,869,562 | 3/1975 | Eidinger et al. | 174/15 C |
| 3,890,613 | 6/1975 | Dunsworth et al. | 61/106 X |

FOREIGN PATENT DOCUMENTS

| 90,088 | 8/1967 | France | 174/15 C |
|---|---|---|---|
| 1,453,592 | 8/1966 | France | 174/15 C |
| 272,189 | 12/1964 | United Kingdom | 174/15 C |
| 1,116,175 | 6/1968 | United Kingdom | 174/23 R |

*Primary Examiner*—Arthur T. Grimley
*Attorney, Agent, or Firm*—Flehr, Hohbach, Test, Albritton & Herbert

[57] ABSTRACT

Underground electrical equipment such as a transformer or cable is prevented from thermal runaway by back-filling the trench in which it is laid with a soil which includes water entrapped in highly water-absorbent hydrophilic polymeric gel particles soaked with water. The water-soaked particles preferably are coated with a water-impermeable film. The water may also be entrapped in liquid form in small balloon-like containers. Also, a water impermeable sheath may be formed around the back-fill soil to minimize evaporation from the particles.

33 Claims, 4 Drawing Figures

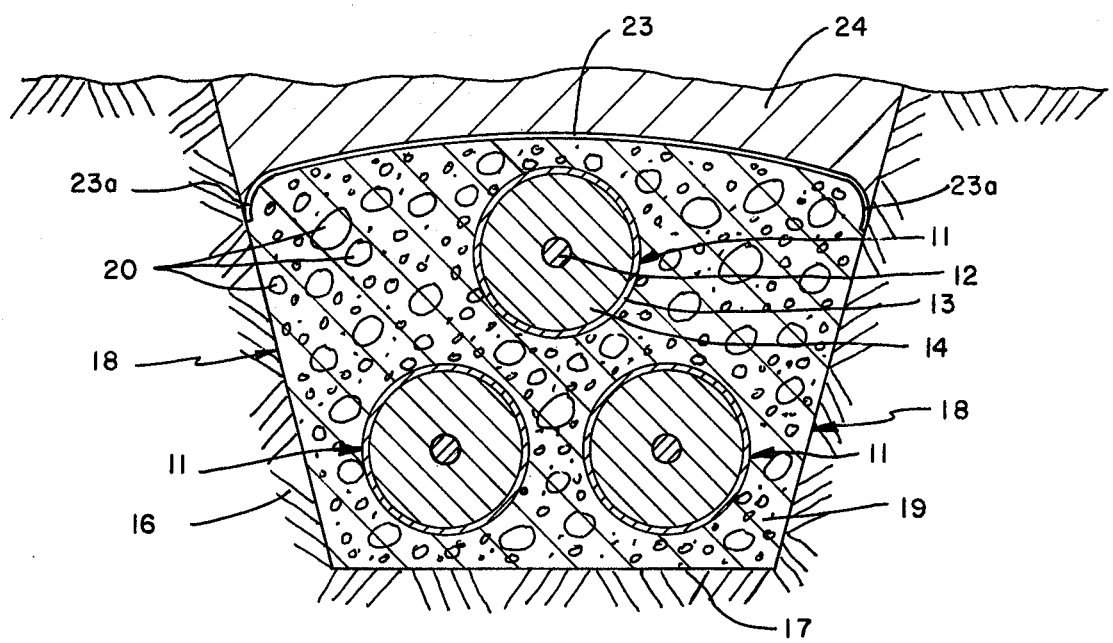
FIG.—1
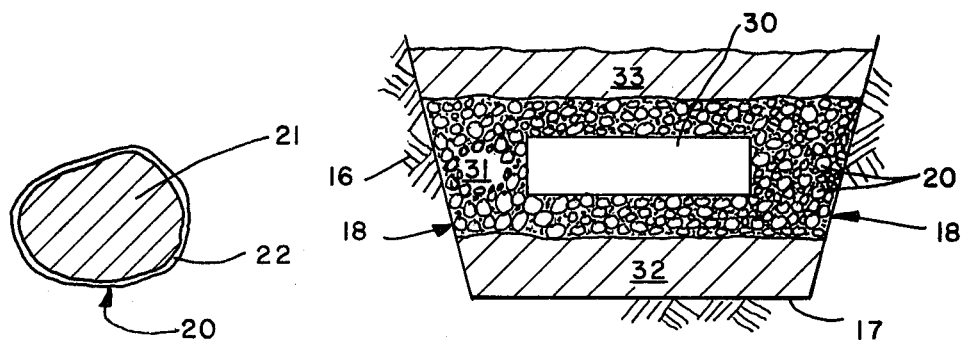
FIG.—2
FIG—4
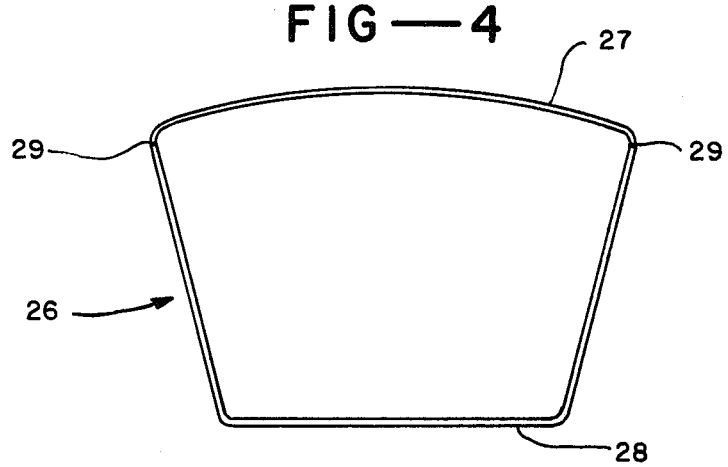
FIG.—3

MEANS FOR PROTECTING UNDERGROUND ELECTRICAL EQUIPMENT FROM THERMAL RUNAWAY

BACKGROUND OF THE INVENTION

An underground conventional electrical transmission or distribution cable includes an inner conductor and an outer metal or polymer sheath with a dielectric material therebetween. During normal conditions in steady state operation, the outer sheath of the cable is maintained at a temperature of about 65° C or less. The temperature of the inner conductor may be as high as 30° C or more in excess of the outer sheath. If the heat at high power loads is not removed from the area of the cable, the higher temperature causes a higher electrical resistance of the conductor and increased power dissipation. It also decreases the threshold for corona, and increases the dielectric loss. Both of the latter effects can lead to more heat generation and eventual cable failure. This deleterious cycle due to poor soil thermal conductivity is referred to as "thermal runaway" which denotes cable overheating and possible failure. Similar effects occur in other heat dissipating electrical equipment such as transformers which are buried underground.

It is known that water has a relatively high thermal conductivity, and also thermal capacity. Thus, the presence of water in an underground soil permits the rapid heat transfer away from power dissipating underground electrical equipment such as a cable. However, the heat from the cable causes the water in the soil to evaporate or migrate and to deplete the water adjacent to the cable. Dried-out soil has considerably less thermal conductivity. Accordingly, heat generated in the cable during steady state and during transient conditions cannot be transferred as effectively from the cable to the surrounding soil. Consequently, the cable is heated even more with a progressively increasing temperature rise; and similarly for other electrical equipment.

It is well known that during the summer months, the thermal conductivity of soil due to moisture content decreases to a minimum. This is due, in large part, to the heating of the soil by solar energy during the longer daytime periods. Thus, thermal runaway is a particular problem during the summer months.

One attempt at retaining water in the soil surrounding the underground cable during the summer months is to back-fill with various gradations of sand. However, the water retention capacity of the soil is not increased to a sufficient extent.

Another attempt to modify the thermal characteristics of soil around underground electrical cables is disclosed in Bennet U.S. Pat. No. 2,066,323. That patent discloses depositing in the soil the additives carbon black, calcium chloride or copper sulfate to increase its "heat absorbing characteristics". It further discloses that water could be added "if desired". However, there is no disclosure of any means for retaining any significant amounts of water with its excellent thermal conductivity in the soil during the hot summer months. The disclosed additives would not accomplish this objective.

Recently, various hydrophilic polymeric gel substances have been developed with extremely high water holding capacities. One such product is described in an article entitled "Super Slurper-Compound With A Super Thirst", *Agricultural Research*, June 1975 (published by Agricultural Research Service, USDA). It is a hydrolyzed starch-polyacrylonitrile graft copolymer. One use disclosed for this material is to increase the water-holding capacity of sand to enhance the top growth of crops such as oats. The article states that the sand, by itself, retains only 24 grams of water compared with 317 grams of water held by the sand-gel mixture at a concentration of one part of gel to 250 parts of sand. Such gels are said to absorb as high as 1,000–2,000 times their weight of water.

Another type of hydrophilic gel is sold by Union Carbide under the trademark "Viterra" hydrogel. This synthetic material is suggested by Union Carbide to be used as an additive to the soil to assist transfer of water and nutrients to a growing plant. Product literature from Union Carbide suggests that the Viterra hydrogel can retain more then twenty times its dry weight of water.

SUMMARY OF THE INVENTION AND OBJECTS

In accordance with the present invention, underground electrical equipment such as a transformer or cable is protected from thermal runaway by surrounding the cable with soil containing dispersions of water-soaked absorbent particles to provide a jacket of high thermal conductivity. The equipment is laid in an open trench. The absorbent particles are added to the soil prior to back-filling of the trench. A preferred form of absorbent particles is a hydrophilic polymeric gel material.

A water impermeable film is preferably coated onto the water-soaked absorbent particles prior to mixing with the soil which minimizes loss of water from the particles. Additional ways to prevent loss of water from the soil around the equipment include laying a water-impermeable sheet above the equipment, or completely surrounding it.

In an alternative embodiment, the particles are formed of flexible balloon-like bags filled with liquid water without an absorbent core.

It is an object of the invention to provide a method and means for protecting underground electrical equipment such as cables and transformers from thermal runaway.

It is a particular object of the invention to accomplish the foregoing object by including highly absorbent particles soaked with water or water-filled, balloon-like bags in the soil back-fill.

It is another object of the invention to retain the water in the soaked absorbent particles by coating them with a film of water-impermeable materials.

It is an additional object of the invention to provide a roof-like sheet to prevent evaporation from the water absorbent particles.

It is another object of the invention to provide a means for preventing water from seeping out of the soil from below and to the sides of the equipment.

Further objects and features of the invention will be apparent from the following description in which the preferred embodiments are set forth in conjunction with the appended drawings.

BRIEF DESCRIPTION OF THE DRAWINGS

FIG. 1 is a cross-sectional view of an underground cable protected from thermal runaway in accordance with the present invention.

FIG. 2 is an expanded cross-sectional view of one of the coated absorbent particles of the present invention.

FIG. 3 is a sheath for further protection of the cable of FIG. 1.

FIG. 4 is a schematic cross-sectional view of another embodiment of the present invention in which underground electrical equipment is protected from thermal runaway.

DETAILED DESCRIPTION OF THE PREFERRED EMBODIMENTS

The present invention relates to a means for protecting an underground electrical cable from thermal runaway. Referring to FIG. 1, three single-phase cables 11 include a central electrical conductor 12, an annular electrically-conducting metal sheath or ground 13 coaxial with the conductor, and dielectric 14 disposed therebetween.

For underground laying of cable 11, a trench 16 is dug typically to a depth of 4 to 6 feet having a bottom wall 17 and upwardly extending side walls 18. Thereafter, cables 11 are laid in the trench and back-filled soil removed during digging of the trench is used to bury the cable. In accordance with the present invention, the back-fill soil 19 surrounding cables 11 contains water-soaked highly absorbent particles 20 in random dispersion. The absorbent particles 20 may be mixed with the soil during back-filling as with a hose system.

Referring to FIG. 2, in a preferred embodiment, particles 20 include a central core 21 formed of highly absorbent material surrounded by a coated film 22 formed of water-impermeable material. In certain environments where water loss from the soil is not excessive, it should be understood that particles 20 may comprise core 21 only without any film coating. The last-named embodiment will be first described in detail.

The purpose of adding the water-soaked absorbent particles to the back-fill surrounding cable 11 is to maintain a higher water content in the soil throughout the year, especially during the hot, dry summer months. Such water content greatly increases the thermal conductivity and also thermal capacity of dry soil. Therefore, heat generated in the cables during steady state and transient conditions is readily transferred from the cable to and through the surrounding soil. This avoids the problems set forth above.

The timing of soaking the uncoated absorbent particles 20 with water may be varied to suit the convenience of the crew laying the cable. Thus, the particles may be soaked prior to dispersion in the back-fill soil, or during or subsequent to back-filling as by pouring water into the trench at such times.

The absorbent material of particles 20 has a high capacity for water so that it can retain a maximum water content in hot summer months. For example, the absorbent preferably is characterized by a water capacity of at least 10–20 times its dry weight. It is preferably in the form of a hydrophilic water-swellable, insoluble, cross-linked polymeric gel material.

If the particles are not protected by coating 22, they should be sufficiently inert to the soil environment and be non-biodegradable to withstand long-term retention in the soil. Suitable inert absorbent materials of this type include cross-linked synthetic polymers. One type is manufactured by Union Carbide Corporation under the trademark "Viterra" hydrogel. This material is a non-ionic polymer which is highly stable over long periods of time, even in high temperatures, is non-biodegradable, and is essentially inert to acids. It is stated to have a water capacity of about 20–25 times its dry weight.

Another type is manufactured by Dow Chemical Corporation under the name "Gel-Guard" and "Aqua-Biber". These materials are stated to be quite stable, non-biodegradable, and not vulnerable to acids.

A number of other solid water-insoluble sorbents that swell in water are described in a paper by Weaver et al entitled "Highly Absorbent Starch-Based Polymer", presented at the International Nonwovens & Disposables Association, Washington, D.C., Mar. 5–6, 1974. One such product is a base-hydrolyzed starch-polyacrylonitrile graft copolymer in which the nitrile functionality has been converted to a mixture of carboxyamide and alkali metal carboxylate. The paper states that after drying to the carboxylate form, this material is capable of imbibing about 700 times its own weight of deionized water.

A particular absorbent of the general type described in the Weaver et al paper is manufactured by General Mills Chemicals, Inc., under the designation "SGP-502S", commonly referred to as "Super Slurper". This product is stated to have a typical water-holding capacity of 800–1,000 ml. of deionized water or 350–450ml. of Minneapolis tap water per gram of product. One problem with this material is that the application of high pressure disrupts the gel structure to release absorbed fluid. Also, water-swollen dispersions of this product are stated to be susceptible to bacterial attack and to deteriorate on prolonged storage at room temperature.

Because of their stability and non-biodegradability, the Gel-Guard and Viterra hydrogel products are particularly suited for use without a protective coating 22. However, they have a far lower water capacity than the less stable, starch-based products described in the Weaver et al paper. The high capacity starch-based products may be employed by coating with a protective film 22 of water-impermeable, non-biodegradable material as set forth hereinafter.

It should be understood that other absorbent material capable of high water retention also may be used in accordance with the present invention. For example, although not as absorbent as polymeric gel materials, certain molecular seive materials as of the inorganic zeolite type may be employed as the absorbent material for possible special soil applications. Such materials may be formed capable of binding water tightly. The theory of such molecular seives is briefly disclosed at columns 3–5 of Rabinowitz U.S. Pat. No. 3,612,939.

In the embodiment of FIG. 1, absorbent particles 20 are formed of a suitable size for random dispersion throughout the back-fill soil. It is preferable to use large particles to minimize the surface to volume ratio and, thus, the surface available for evaporation. By premixing soil with relatively large particles (e.g., 10 cm effective diameters or more) the soil fills any void spaces created between the large particles. This minimizes such void pockets of extremely low thermal conductivity. Such voids may also be filled by using some smaller particles 20 together with the larger ones. To minimize evaporation and also permit uniform dispersion, it is believed that a gradation of particle sizes would be most effective, say, with effective diameters as small as 0.5 cm. to as large as 10 cm., or even larger. The precise sizing is not critical and will depend upon the type and depth of soil. A suitable soil includes at least 20% of the particles with a diameter of at least 0.5 cm.

Since the object of the invention is to increase the thermal capacity of the soil by increasing its water content, it is apparent that the absorbent materials of the present invention should be soaked with sufficient quantities of water and for a sufficient time to essentially saturate the absorbent materials. In this manner, the thermal capacity of the soil is maximized for a given quantity of added absorbent particles.

Referring to FIG. 2, the preferred embodiment of absorbent particles 20 is illustrated in which the absorbent water-soaked core is coated with a thin film of material which is essentially impermeable to water and non-biodegradable in the soil.

A major advantage of film 22 is to prevent evaporation of water from the water-soaked core material. In an ideal system, the coating is totally impermeable to water. Thus, all of the water initially present in the soaked core 21 would be retained in the back-fill soil. Of course, cracks in the coating may develop during abrasion or under the pressure of the back-fill soil. However, even in these instances, the great majority of the core material is protected from exposure to evaporation, thereby increasing the life of water retention to a major extent.

Another advantage of such coating is to protect the absorbent particles core from biological components of the soil. Thus, such a coating can protect a biodegradable starch-based absorbent core material of the foregoing type.

The thickness of film 22 should be sufficient to provide strength to withstand handling and the pressures created during back-filling. In addition, the film should be of sufficient thickness to prevent permeation of water therethrough. These characteristics are dependent not only upon thickness but also upon the type of material employed for the film. In general, the film of a thickness of 250 microns or less is believed to be suitable for most coating materials. If the coating material is characterized by a low thermal conductivity it is preferably to minimize the thickness of the film to obtain maximum benefit from the high thermal conductivity of the water-soaked absorbent core.

Suitable materials for forming of the water impermeable film comprises various synthetic polymers such as polyvinyl chloride, acrylic polymers, poly-tetrafluoroethylene, or monoolefins such as polyethylene or polypropylene. Other materials such as paints or shellacs including metals or other inorganic fillers may also be employed.

In another form, coating 22 may be in laminate form and comprising two or more layers as where a single layer may not possess all of the desired properties. For example, an inner hydrophilic polymer, such as polyvinyl acetate or a polyester, is readily coated as a film onto soaked absorbent core 21. However, it may not possess sufficient impermeability to prevent substantial evaporation of water from cores 21 and may not be of a character to adequately protect the core from harmful elements in the soil. Thus, a second film sufficiently impermeable to protect the core and prevent evaporation such as polyvinylidene chloride may be coated readily onto the first layer but not onto the core directly.

In a further enbodiment, instead of forming a laminate to combine layers of different properties in coating 22, a single coating may be applied with modified surface characteristics. For example, the surface of a polystyrene film coating, which is hydrophobic, may be rendered hydrophilic by grafting a hydrophilic monomer onto its surface such as a polyalkyl alcohol or polyhydroxyethyl methacrylate. Known grafting techniques may be employed such as oxidation of the film surface to create free radical sites.

One suitable coating material would be a hydrophilic polymer which maintains its structural integrity in the form of a film even in the presence of water. Such a material could be sprayed with an appropriate carrier and permitted to dry on and be bonded to the surface of the particles. Suitable hydrophilic polymers include certain acrylic resins and, under certain circumstances, polyvinyl alcohol.

Hydrophobic polymeric materials may also be employed for the film by use of known techniques. For example, core 21 could be passed through a thin, wet polymer film, say, formed of a solution of polyethylene. Upon piercing of the film by core 21, a portion of the film wraps around the particles and seals against itself. Then the solvent is permitted to dry. Such hydrophobic coating would not be bonded to the absorbent core.

In another technique, the absorbent soaked particles could be placed in very thin open containers of dry polymeric material which are then sealed. For example, the particles may be placed into flexible bags followed by heat sealing of the bag opening. Also, the absorbent particles may be placed in rigid containers formed, say, of two hemispheres of a thermo plastic polymer, e.g., polystyrene. Then, the hemispheres are sealed as by the application of heat.

The techniques of spraying a film of shellac, varnish or paint onto a surface are well known. For example, spray cans are available including propellants for spraying such materials in a suitable carrier onto the core for rapid drying.

For uniform coating with a spray, it is preferable that the particles be rotated during spraying. One technique for this purpose is to convey the particles to the top of a spray chamber and simultaneously contact them with the spray during gravitation of the particles.

In another embodiment, the particles could be sprayed on a vibratory or air bearing conveyor. In this embodiment, soaking and coating may be accomplished in the same system. For example, the absorbent cores may pass on a conveyor through a first zone in which they are soaked with water and, thereafter, through a second zone in which the film is applied.

When the absorbent particles are not protected by a film 22, it may be desirable to include surfactant chemicals to reduce the rate of evaporation. Such surfactants would be most beneficial for back-fill soil subjected to very hot dry temperatures, such as in desert-like areas.

Referring again to FIG. 1, an elongate impermeable, non-biodegradable roof-like sheet 23 is disposed over the upper surface of back-fill soil 19 containing absorbent particles 20. Sheet 23 is illustrated in a convex shape of moderate curvature with downwardly directed edges 23a contacting the trench wall. The purposes of top sheet 23 is to minimize upward evaporation of water from soaked absorbent particles 20, especially in a hot, arid climate. Top sheet 23 is disposed at a sufficient depth in trench 16 to permit back-filling over it with soil 24 which does not contain absorbent particles. Suitable materials for top sheet 23 include polyvinyl chloride or polypropylene.

Referring to FIG. 3, a sheath generally denoted by the number 26 is illustrated serving, when disposed in trench 16, to isolate back-fill soil 19 containing absorbent particles 20 from the surrounding soil. This further minimizes water loss from the water-soaked absorbent particles. Sheath 26 may include a roof-like top sheet 27, similar to top sheet 23 of FIG. 1, and a lower sheet 28 of U-shaped cross-section conforming to the adjacent trench walls. The two portions of sheath 26 are formed of water-impermeable, non-biodegradable material such as a synthetic polymer. The edges of the two portions are sealed at 29, with a suitable adhesive. Alternatively, if sheets 27 and 28 are formed of a thermoplastic material, such as polyethylene, seal 29 may be formed by heat-sealing. In an embodiment, not shown, the seal may be omitted with sheet 28 serving to prevent water removal below and to the sides of the cable.

Sheath 26 is formed in a trench 16 by the following steps. After the trench is dug, lower sheet 28 is laid to conform to the trench walls. Then, the cable is laid to the interior of lower sheet 28 together with back-fill soil containing soaked absorbent particles 20. Then, top sheet 27 is placed over the upper surface of the back-filled soil and sealed with lower sheet 28. Finally, the remainder of the back-fill soil without absorbent is placed over sheet 28.

Referring to FIG. 4, another embodiment of the underground structure of buried electrical equipment broadly denoted by the number 30 is schematically illustrated in which the soaked absorbent particles 20 are distributed in a concentrated, compacted layer surrounding the electrical equipment. The invention is applicable to any buried electrical equipment 30, such as the aforementioned cables, transformers, or the like which generate heat which must be transferred away from the equipment. Like portions of FIG. 3 will be designated with like numbers in FIG. 4. The electrical equipment 30 such as a transformer or cables is totally surrounded with a layer 31 which includes a major portion of and preferably consists essentially of, particles 20.

Referring again to FIG. 4, the following sequence of steps may be employed to form the underground structure. First, the trench is dug and, optionally, partially back-filled with soil layer 32 containing some absorbent particles 20. Then, the equipment 30 is laid and surrounded with layer 31 exclusively containing absorbent particles 20 including a size gradation of sufficient small particles to fill the voids among the larger ones. Soaking of the particles may be performed by previously mentioned techniques and in one of the sequences set forth above. Finally, a further layer 33 of back-fill soil and absorbent particles 20 is deposited over layer 31.

The advantage of the structure of FIG. 4 is apparent from the following analysis. To maximize heat removal from a heat source, it is more important to concentrate the increase in the thermal conductivity of the medium immediately adjacent to the source than to disperse the increase over a larger volume. Applying this principle to the present invention, for a given volume of sorbent particles 20, it is preferable for a maximum increase in heat transfer to concentrate the particles as illustrated in FIG. 4 rather than to disperse them throughout the trench volume as in FIG. 1.

There may be special circumstances when dispersion as in FIG. 1 is preferable. For example, as set forth above, particles 20 may be so large that substantial air void space of low thermal conductivity would be created between particles. Premixing with soil would fill the voids to some extent with soil of better thermal conductivity than air.

In an alternative embodiment, the water-soaked absorbent core of the jacketed particles of FIG. 2 may be replaced by liquid water. In this instance, layer 22 is of sufficient strength to resist rupturing during the back-filling operation and afterwards. Of course, rupturing is more critical in this water embodiment than in the foregoing sorbent core one because the liquid water would be free to run out of the rupture whereas the sorbent would retain the water under the pressure of overhead soil. A suitable jacket for a layer 22 is a flexible balloon-like bag formed of substantially water-impermeable polymeric material. Thus, the water could be filled into polyethylene bags of the foregoing preferred size ranges which are then heat-sealed. It is important to avoid substantial air bubbles during filling which would reduce the thermal conductivity of the particles.

What is claimed is:

1. In a method for protecting underground heat-generating electrical equipment from thermal runaway, the steps of
    (a) laying the equipment in an open trench,
    (b) back-filling the trench with soil in which water-absorbent particles are dispersed, said particles comprising a water-swellable, hydrophilic polymer gel material capable of swelling to absorb at least ten times its own weight of water, and
    (c) soaking said absorbent particles with water.

2. The method of claim 1 in which said soaking step is performed prior to back-filling.

3. The method of claim 1 in which said soaking step is performed by pouring water into the trench during back-filling.

4. The method of claim 1 in which said soaking step is performed by pouring water into the trench subsequent to back-filling.

5. The method of claim 1 in which after soaking, said absorbent particles are coated with a substantially water-impermeable film of sufficient strength to withstand mixing with soil and thereafter said coated particles are dispersed in said soil prior to back-filling.

6. The method of claim 1 in which said absorbent particles are dispersed into said soil prior to back-filling.

7. The method of claim 1 in which, after backfilling and swelling, a water impermeable sheet is placed over the back-filled trench to reduce evaporation of water from said soaked absorbent particles.

8. The method of claim 1 in which said absorbent particles and soil are premixed prior to back-filling.

9. The method of claim 1 in which said absorbent particles are deposited as a concentrated layer around the electric equipment without premixing with substantial back-fill soil.

10. In a method for protecting underground electrical equipment from thermal runaway, the steps of
    (a) digging a trench for the equipment,
    (b) depositing an elongated impermeable lower sheet with upwardly extending sidewalls and a bottom wall to conform to the trench,
    (c) laying the equipment in the interior of the lower sheet,
    (d) back-filling around the equipment with soil in which water-absorbent particles are dispersed comprising a water-swellable hydrophilic polymer gel material capable of swelling to absorb at least ten times its own weight of water, and
    (e) soaking said absorbent particles with water.

11. The method of claim 10 in which an impermeable top sheet is placed over the upper surface of said back-filled soil to reduce evaporation of water from said soaked absorbent particles.

12. The method of claim 11 in which the upper edges of said bottom sheet are sealed with the side edges of said top sheet.

13. An underground electrical equipment structure protected from thermal runaway comprising,
(a) the equipment,
(b) back-fill soil around said electrical equipment, and
(c) water-soaked absorbent particles dispersed in said soil, said particles comprising a water-swellable hydrophilic polymer gel material capable of swelling to absorb at least ten times its own weight of water.

14. The structure of claim 13 together with an elongated impermeable top sheet disposed over the upper surface of said back-filled soil and equipment.

15. The structure of claim 13 together with an elongate impermeable lower sheet with upwardly extending sidewalls and a bottom wall disposed below and to the sides of said equipment.

16. The structure of claim 13 in which the upper side edges of said upper sheet are sealed to the side edges of said top sheet.

17. The structure of claim 13 in which said absorbent particles form a concentrated layer around said equipment.

18. The structure of claim 13 in which said absorbent particles are present in a gradation of sizes sufficient for void spaces among the larger particles to be filled to a significant extent with smaller particles.

19. The structure of claim 13 in which said equipment comprises electrical cable.

20. In a method for forming particles of high thermal conductivity suitable for dispersion in soil to increase its thermal conductivity, the steps of
(a) soaking absorbent particles with water said particles comprising a material capable of absorbing at least 10 times its own weight of water, and
(b) coating said soaked absorbent particles with a substantially water-impermeable film of sufficient strength to withstand mixing with soil.

21. The method of using the particles formed in claim 20 to increase the thermal conductivity of soil comprising the step of
(c) mixing said coated particles with a volume of soil.

22. The method of claim 20 in which an underfilm compatible with said absorbent particles is coated onto said particles prior to coating of said soaked absorbent particles, said water-impermeable film and underfilm being formed of different materials.

23. A product of high thermal conductivity suitable for dispersion in soil to increase its thermal conductivity comprising,
(a) absorbent particles soaked with water, said particles comprising a material capable of absorbing at least 10 times its own weight of water, and
(b) a substantially water-impermeable film surrounding each of said particles of sufficient strength to withstand mixing with soil.

24. The product of claim 23 in which said soaked particle material comprises a hydrophilic polymeric gel.

25. The product of claim 23 in which said water-impermeable film is formed of a polymeric material.

26. The product of claim 23 in which an intermediate underfilm is present between said water impermeable film and absorbent particles, said films being formed of different materials.

27. In a method for protecting underground electrical equipment from thermal runaway, the steps of
(a) laying the equipment in an open trench,
(b) back-filling the trench with soil and
(c) placing a plurality of water-filled bags into the back-fill soil around the equipment.

28. The method of claim 27 in which at least 20% of said bags have an effective diameter of at least 0.5 cm.

29. The method of claim 27 in which said bags are formed of a flexible substantially water-impermeable material.

30. An underground electrical equipment structure protected from thermal runaway comprising,
(a) the equipment,
(b) back-fill soil around said equipment, and
(c) a plurality of water-filled bags in said back-fill soil around the equipment.

31. The structure of claim 30 together with an elongated impermeable top sheet disposed over the upper surface of said back-filled soil and equipment.

32. The structure of claim 31 together with an elongate impermeable lower sheet with upwardly extending sidewalls and a bottom wall disposed below and to the sides of said equipment.

33. The structure of claim 32 in which the upper side edges of said upper sheet are sealed to the side edges of said top sheet.

* * * * *